US011043341B2

(12) United States Patent
Kitamura et al.

(10) Patent No.: US 11,043,341 B2
(45) Date of Patent: Jun. 22, 2021

(54) KEYBOARD BASEPLATES INCLUDING A CONCAVE STRUCTURE FOR HOUSING A LOGIC SUBSTRATE

(71) Applicant: LENOVO (Singapore) PTE. LTD., New Tech Park (SG)

(72) Inventors: Masahiro Kitamura, Yokohama (JP); Satoshi Douzono, Yokohama (JP); Takanori Koike, Yokohama (JP); Kazumi Nakaju, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/853,413

(22) Filed: Apr. 20, 2020

(65) Prior Publication Data

US 2020/0343056 A1 Oct. 29, 2020

(30) Foreign Application Priority Data

Apr. 26, 2019 (JP) ............... JP2019-086854

(51) Int. Cl.
*G06F 3/033* (2013.01)
*H01H 13/81* (2006.01)
*G06F 3/023* (2006.01)

(52) U.S. Cl.
CPC ............. *H01H 13/81* (2013.01); *G06F 3/023* (2013.01)

(58) Field of Classification Search
CPC ............ G06F 3/033; G06F 3/02; G06F 3/023; G09G 5/08; G09G 5/00; H01H 13/81
See application file for complete search history.

(56) References Cited

U.S. PATENT DOCUMENTS

| 5,557,500 | A | * | 9/1996 | Baucom | G06F 1/203 361/679.54 |
|---|---|---|---|---|---|
| 2003/0007323 | A1 | * | 1/2003 | Huang | G06F 1/1616 361/679.09 |
| 2013/0188960 | A1 | * | 7/2013 | Gao | H04N 21/42225 398/106 |
| 2014/0139434 | A1 | * | 5/2014 | Masubuchi | G06F 3/0383 345/161 |
| 2014/0225830 | A1 | * | 8/2014 | Tamura | G06F 3/0338 345/157 |
| 2015/0160750 | A1 | * | 6/2015 | Wu | G06F 3/041 345/173 |
| 2019/0155401 | A1 | * | 5/2019 | Chen | G06F 3/0221 |
| 2020/0174579 | A1 | * | 6/2020 | Li | G06F 3/0224 |
| 2020/0218362 | A1 | * | 7/2020 | Madsen | G06F 3/0202 |

FOREIGN PATENT DOCUMENTS

| JP | 11327686 | A | 11/1999 |
|---|---|---|---|
| JP | 2012014473 | A | 1/2012 |
| JP | 2012208870 | A | 10/2012 |
| JP | 2014153968 | A | 8/2014 |
| JP | 2017027684 | A | 2/2017 |

* cited by examiner

*Primary Examiner* — Pegeman Karimi
(74) *Attorney, Agent, or Firm* — Kunzler Bean & Adamson (57) ABSTRACT

Apparatuses and systems that include a keyboard baseplate including a concave structure with a logic substrate housed therein are disclosed. One apparatus includes a keyboard baseplate including a concave structure formed thereon and a lower surface having a side. The apparatus further includes a logic substrate provided on the side of the lower surface of the baseplate and housed within the concave structure. The logic substrate is configured to receive an analog signal generated by a sensor and convert the analog signal to a digital signal.

20 Claims, 8 Drawing Sheets

KEYBOARD BASEPLATES INCLUDING A CONCAVE STRUCTURE FOR HOUSING A LOGIC SUBSTRATE

FIELD

The subject matter disclosed herein relates to computing systems and devices and, more particularly, relates to keyboard baseplates including a concave structure for housing a logic substrate.

BACKGROUND

Some conventional computing systems and/or computing devices (e.g., a laptop computer) include a pointing stick device mounted on its keyboard device. A typical pointing stick device includes a pointing stick and/or other operational unit, a sensor substrate, and a logic substrate. The sensor substrate converts an operating force applied to the pointing stick into an analog signal and outputs the analog signal to the logic substrate. The logic substrate converts the analog signal sent from the sensor substrate into a digital signal to move a cursor on a display device. Often, one or more components in the structure of the keyboard device cause the keyboard device to include a relatively large/high profile and/or cause the keyboard device to be thicker than it otherwise could be.

BRIEF SUMMARY

Various embodiments provide apparatuses and systems that include a keyboard baseplate including a concave structure with a logic substrate housed therein. One embodiment provides an apparatus comprising a keyboard baseplate including a concave structure formed thereon and a lower surface having a side. The apparatus further includes a logic substrate provided on the side of the lower surface of the baseplate and housed within the concave structure. The logic substrate is configured to receive an analog signal generated by a sensor and convert the analog signal to a digital signal.

Other embodiments provide an apparatus comprising a keyboard device including a plurality of keys, a baseplate supporting the plurality of keys, and a logic substrate provided on the side of a lower surface of the baseplate. The baseplate includes a concave structure formed thereon. The logic substrate is housed within the concave structure and is configured to receive an analog signal generated by a sensor and convert the analog signal to a digital signal.

Various embodiments of a system comprise a display device and a keyboard device coupled to the display device. The keyboard device comprises a plurality of keys, a baseplate supporting the plurality of keys, and a logic substrate provided on the side of a lower surface of the baseplate. The baseplate includes a concave structure formed thereon. The logic substrate is housed within the concave structure and is configured to receive an analog signal generated by a sensor and convert the analog signal to a digital signal.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Various embodiments disclosed herein provide an electronic apparatus and/or a keyboard device that includes a pointing stick, a thin or low-profile keyboard, and/or a thin or low-profile chassis. A keyboard device according to a first embodiment of includes a keyboard device including a baseplate, a pointing stick provided on the side of an upper surface of the baseplate, a sensor substrate configured to detect an operating force applied to the pointing stick to output an analog signal, and a logic substrate provided on the side of the lower surface of the baseplate.

The logic substrate, in some embodiments, is configured to convert the analog signal from the sensor substrate into a digital signal. In additional or alternative embodiments, the baseplate includes a concave structure formed by concaving the lower surface toward the side of the upper surface and the logic substrate is housed within the concave structure. The logic substrate being housed within the concave structure on the lower surface of the baseplate prevents or substantially prevents the logic substrate from projecting from the lower surface of the baseplate, which enables the keyboard device to include a thin or low-profile structure.

The logic substrate, in various embodiments, may include a semiconductor chip mounted on one surface thereof. The semiconductor chip may be housed within the concave structure in a position in which the top surface of the semiconductor chip is directed toward the bottom surface of the concave structure. Further, the concave structure may include a support mount configured to support the logic substrate to thereby create a space between the top surface of the semiconductor chip and the bottom surface of the concave structure. As such, the semiconductor chip can be mounted in an electrically insulated state, while not being in contact with the baseplate.

In some embodiments, the keyboard device may further include a press button rotatably supported on the side of the upper surface of the baseplate and the concave structure may be provided in a position overlying the press button. The distance and range of an up-down movement of the rotating press button may be relatively small compared to a key or the like button on the keyboard device that includes an operational surface that moves up and down as a whole. Here, a relatively large dead or empty space can be formed on the side of the lower surface of the press button. As such, the concave structure is provided in a position overlying the press button so that a convex structure (or the corresponding reverse/opposite structure of the concave structure) can be formed on the side of the upper surface of the baseplate and disposed in the dead or empty space.

The press button, in various embodiments, may include an operational surface configured to receive a pressing operation and a hinge arm projecting from one edge of the operational surface. The hinge arm can include a leading end portion that is rotatably supported relative to the baseplate. Since the hinge arm or the like structure is not disposed below the operational surface of the press button, a larger space can be created to form the concave structure.

In various embodiments, the concave structure may be disposed in a position overlying the operational surface of the press button, but not overlying the hinge arm. As such, the convex structure (or the reverse/opposite structure of the convex structure) formed on the side of the upper surface of the baseplate can be prevented from interfering with the hinge arm.

The press button, in additional or alternative embodiments, may include at least a first press button and a second press button. Further, the concave structure may include at least a first concave portion provided in a position overlying the first press button and a second concave portion provided in a position overlying the second press button. The logic substrate may include at least a first substrate portion and a second substrate portion electrically connected to the first substrate portion. The first substrate portion may be housed in the first concave portion and the second substrate portion may be housed in the second concave portion. As such, even in the case when the space created below a single press button to form a concave structure is relatively small, the space below two or more press buttons can be used to form a plurality of concave structures, so that the logic substrate can be housed in the respective concave structures.

An electronic apparatus and/or keyboard device according to various embodiments includes a chassis including the above-mentioned keyboard mounted on the upper surface thereof and further includes an electronic circuit board provided inside thereof with the logic substrate electrically connected to the electronic circuit board. This structure can provide a high level of operability with the pointing stick and/or provide a thin or low-profile chassis. Accordingly, the various embodiments disclosed herein can provide a thin or low-profile device equipped with a pointing stick located on a side of the device.

Figure 1:
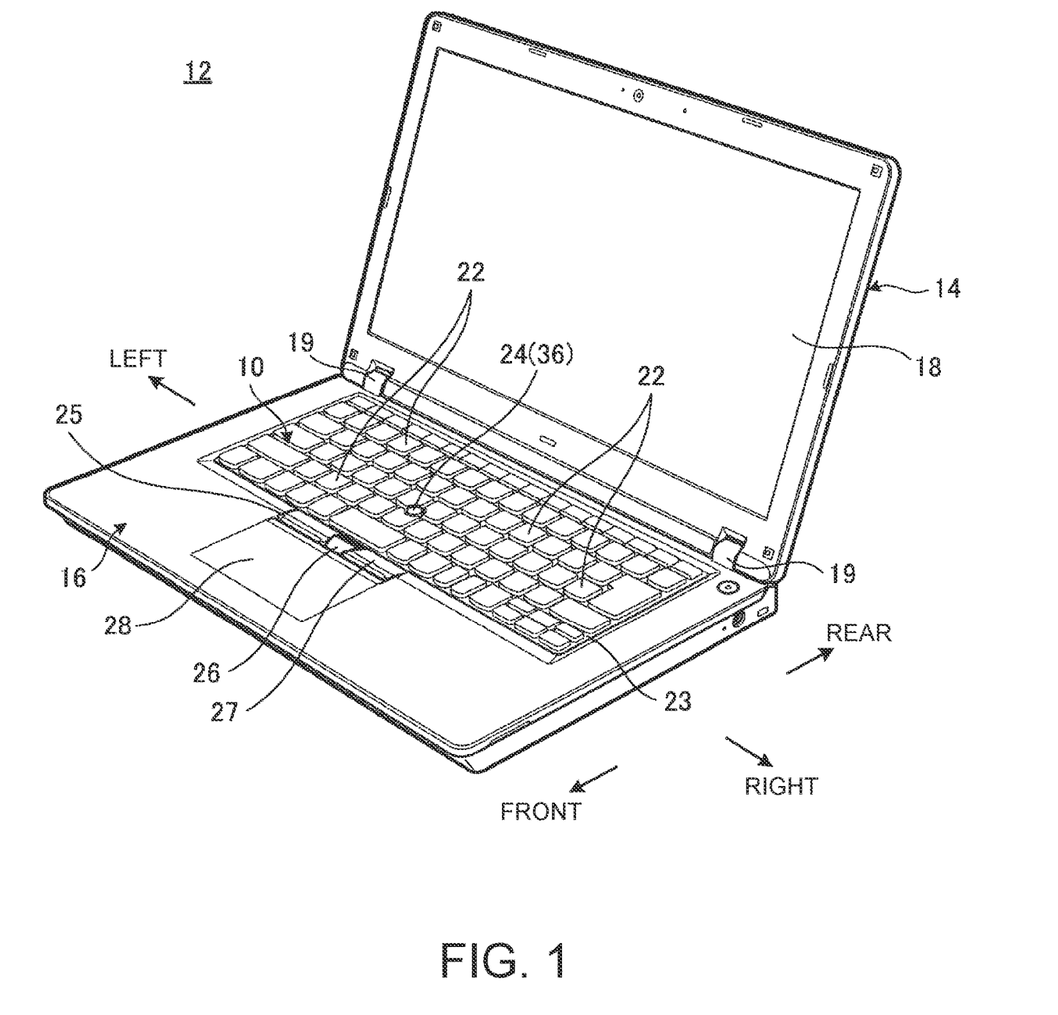
FIG. 1 is a schematic diagram illustrating a perspective view of one embodiment of a laptop computing device including a keyboard device.

Turning now to the figures, FIG. 1 is a perspective view of one embodiment of an electronic apparatus 12 equipped with a keyboard device 10. At least in the illustrated embodiment, the electronic apparatus 12 is a laptop personal computer (PC) that includes the keyboard device 10 mounted thereon and further includes a display chassis 14 that is rotatably connected to a main chassis 16. Alternatively, the keyboard device 10 may be an external keyboard device or the like device connected to, for example, a desktop PC.

In the following description of the keyboard device 10 illustrated in FIG. 1, a direction viewed from a user using the electronic apparatus 12 is used as a point of reference. Here, the side of the keyboard device 10 that is closer to the user is referred to herein as the front or front side and a side that is farther or away from the user is referred to herein as the rear or rear side (e.g., the y-direction), the thickness of the main chassis 16 is referred to herein as up and down or high and low (e.g., the z-direction), and the width direction is referred to as right and left (e.g., the x-direction).

The display chassis 14, in some embodiments, includes a thin box chassis. In additional or alternative embodiments, the display chassis 14 includes a display 18. The display 18 is, for example, a liquid crystal display (LCD). The display chassis 14, in some embodiments, is rotatably connected to the main chassis 16 via a hinge 19.

In certain embodiments, the main chassis 16 includes a thin box chassis. A motherboard 20 (see, e.g., FIG. 2) or a main electronic circuit board of the electronic apparatus 12 can be housed inside the main chassis 16. Inside the main chassis 16, various electronic components (e.g., a central processing unit (CPU) or a memory) mounted on the motherboard 20, a battery device, a cooling device, and/or the like devices can be housed.

The keyboard device 10, in various embodiments, is mounted on the upper surface of the main chassis 16. In some embodiments, the keyboard device 10 includes a plurality of keys 22 or key tops or 22 aligned in the front-rear and right-left directions. Adjacent keys 22 or key tops 22 are segmented by a frame 23.

In various embodiments, a pointing stick 24 is provided at the middle or substantial middle of the keyboard device 10. The pointing stick 24, in certain embodiments, includes an input device configured to operate a cursor (e.g., a mouse pointer) displayed on the display 18. In some embodiments, the pointing stick 24 is operable as a substitute for a mouse.

In additional or alternative embodiments, three (3) press buttons 25, 26, 27 are provided at the middle or substantial middle of the front edge of the keyboard device 10. In various embodiments, the press buttons 25, 26, and 27 include functionality linked with and/or operate in combination/conjunction with a cursor operation of the pointing stick 24 or a touch pad 28. The touch pad 28, in various embodiments, is an input device located in front of the press buttons 25 to 27 and is operable as a substitute for a mouse similar to the pointing stick 24.

Figure 2:
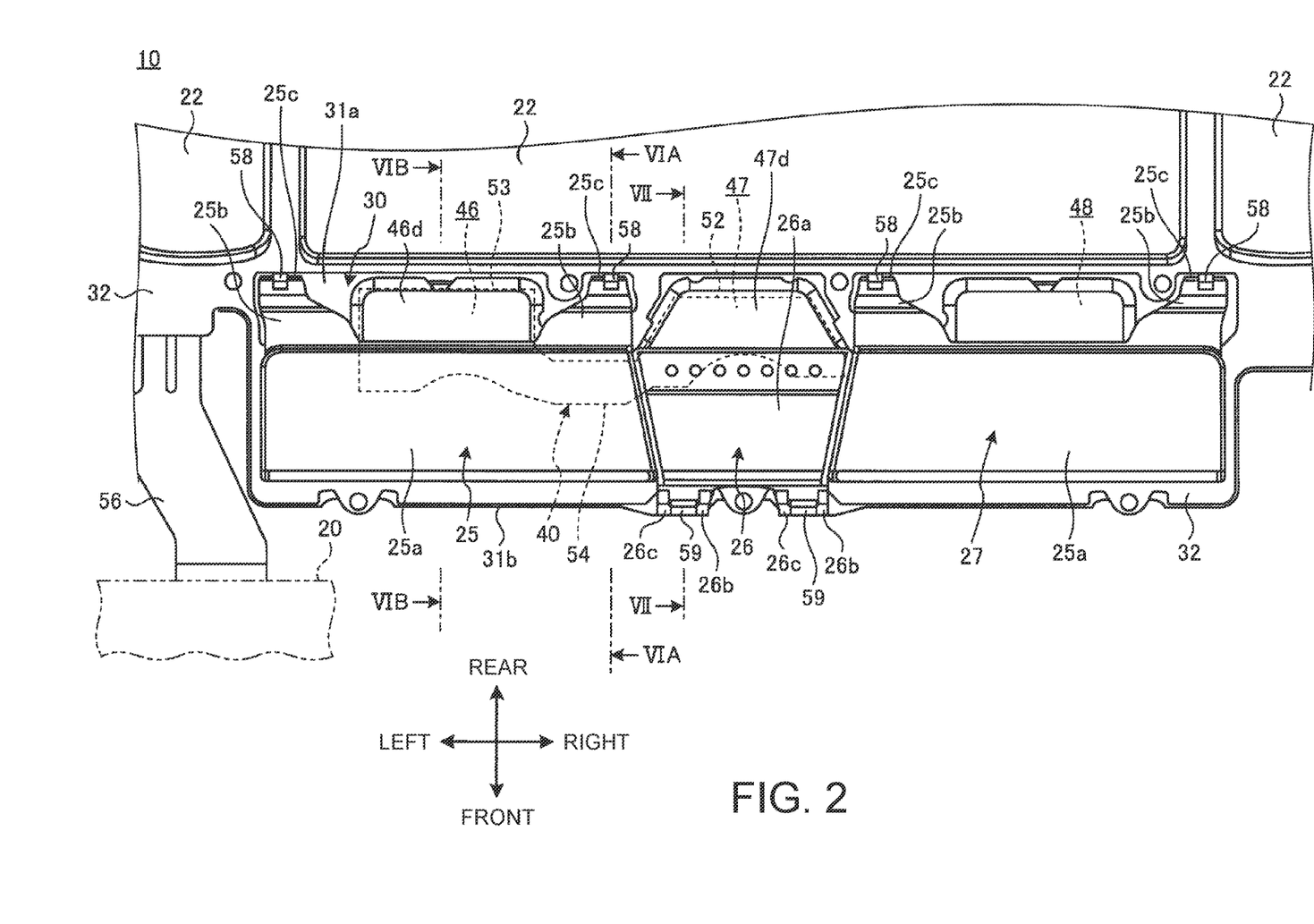
FIG. 2 is a diagram schematically illustrating a plan view of a portion of the laptop computing device of FIG. 1 that includes one embodiment of a press button.

As included herein, FIG. 2 is an enlarged plan view of the press buttons 25, 26, and 27 of the keyboard device 10 that omits a portion therearound of the frame 23. Further, FIG. 3 is an enlarged bottom view of a major portion of the keyboard device 10.

Figure 3:
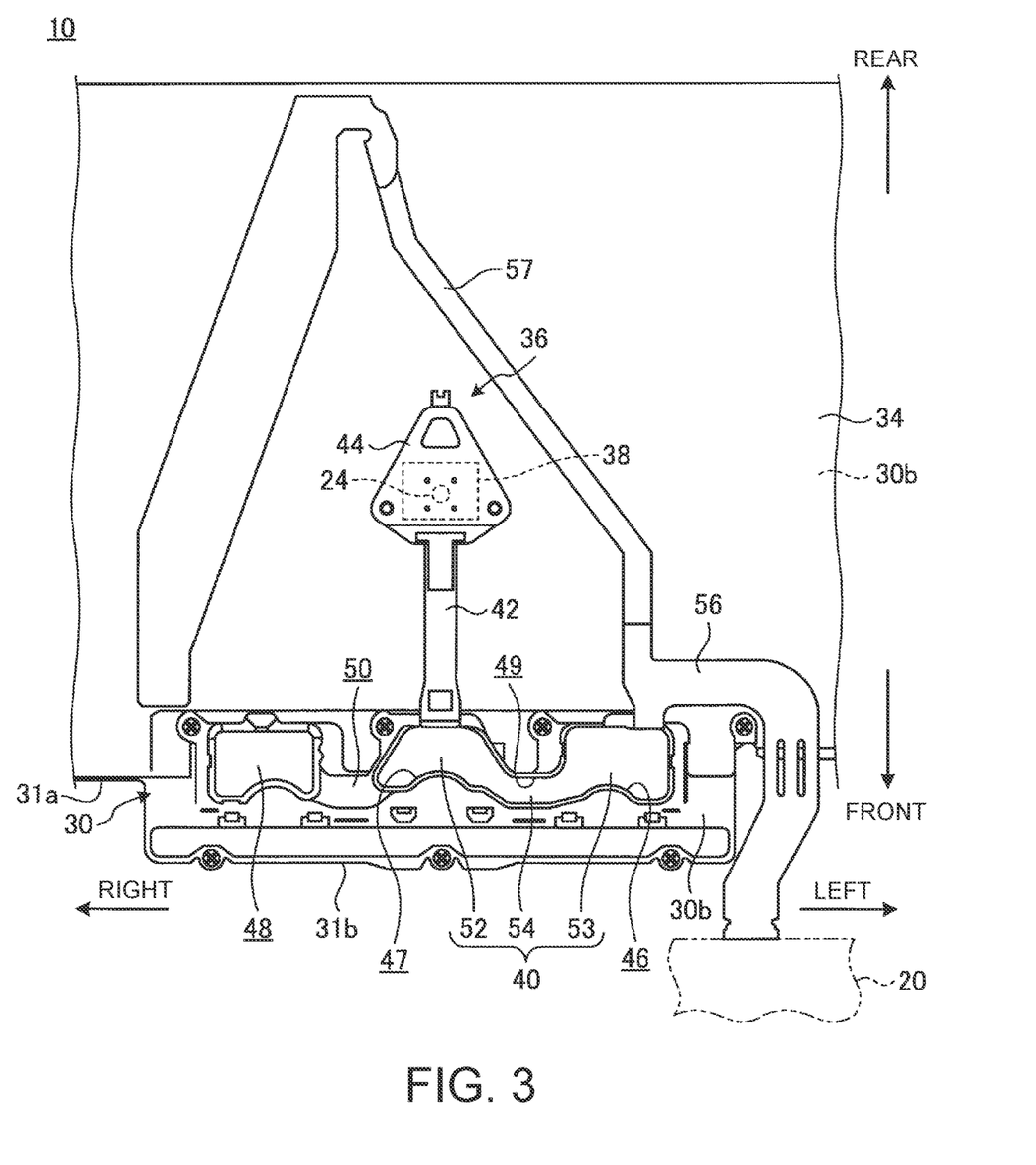
FIG. 3 is a schematic diagram illustrating a bottom view of the laptop computing device of FIG. 1.

As illustrated in FIGS. 2 and 3, the keyboard device 10 includes a baseplate 30 that provides a mount plate for the respective key tops 22 and the press buttons 25, 26, and 27. The baseplate 30, in some embodiments, is formed by cutting and raising or perforating a thin plate of metal (e.g., aluminum, stainless steel, and/or the like metals or alloys) at various points thereon.

At least in the illustrated embodiment, the baseplate 30 includes, among other components, a first plate 31a and a second plate 31b. The first plate 31a, in various embodiments, includes a large rectangular or substantially rectangular plate that can support all the key tops 22. In additional or alternative embodiments, the second plate 31b includes a small rectangular or substantially rectangular plate that can support the press buttons 25, 26, and 27. The second plate 31b, in certain embodiments, includes a portion that projects forward from the middle or substantial middle of the front edge of the first plate 31a.

Figure 6A:
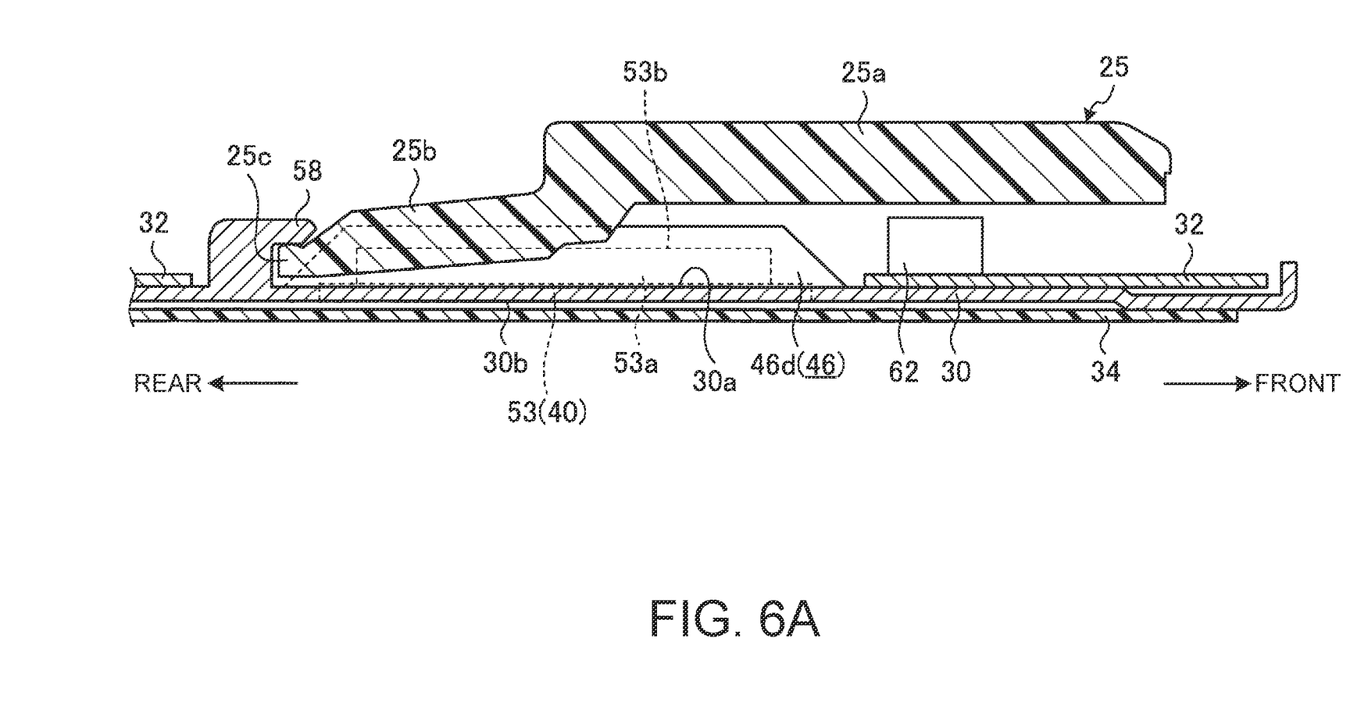
FIG. 6A is a diagram schematically illustrating a cross-sectional view along the line VIA-VIA shown in FIG. 2.

The baseplate 30, in some embodiments, includes a membrane sheet 32 stacked on an upper surface 30a of the baseplate 30 and a light guide plate 34 stacked on a lower surface 30b of the baseplate 30 (see also, to FIG. 6A). The membrane sheet 32, in various embodiments, includes a three-layered switch sheet with a set of closable contact points. In some embodiments, the set of closable contact points includes a fixed contact point that overlies a moveable contact point. In certain embodiments, for example, when a fixed contact point that overlies a movable contact point is pressed, the fixed contact point is brought into close contact with the movable contact point to thereby close the contact point(s).

In additional or alternative embodiments, the membrane sheet 32 includes a structure including a contact switch. The contact switch, in certain embodiments, includes an electrically conductive rubber portion that functions to short or short-circuit a circuit. The membrane sheet 32, in some embodiments, includes a set of through holes at one or more points. In certain embodiments, an elevation guide of the key tops 22 is mounted on the upper surface 30a of the baseplate 30 through one or more of the through holes.

A key top 22 can move up and down via a guide operation of the elevation guide. In some embodiments, in response to a key top 22 being lowered, the descending key top 22 switches or turns ON the membrane sheet 32 via a rubber dome (not illustrated). In alternative embodiments, the membrane sheet 32 may be stacked on the side of the lower surface 30b of the baseplate 30.

In some embodiments, a light guide plate 34 guides and reflects the light emitted from a light source (e.g., a light-emitting diode (LED) device) so that the respective key tops 22 are illuminated with the light from the side of their lower surfaces. In alternative embodiments, the light guide plate 34 is omitted and a waterproof sheet may be provided instead.

As illustrated in FIG. 3, one embodiment of the keyboard device 10 includes a pointing stick device 36. As shown, the pointing stick device 36 includes the pointing stick 24 (see, e.g., FIG. 1), a sensor substrate 38, a logic substrate 40, and a cable 42.

In various embodiments, the pointing stick 24 includes a cylindrical member secured on an upper surface of the sensor substrate 38 and projects in an upward direction (e.g., a positive z-direction). The sensor substrate 38, in certain embodiments, is provided on an upper surface of a bracket 44. The bracket 44, in some embodiments, is disposed on the side of a lower surface of the light guide plate 34 and is mounted on the lower surface 30b of the baseplate 30.

The sensor substrate 38, in various embodiments, includes a plurality of distortion sensors disposed on the upper surface of a printed circuit board (PCB), for example. In certain embodiments, the sensor substrate 38 is configured to detect (e.g., via the distortion sensor(s)) an operating force applied to the pointing stick 24 and convert the operating force into an analog electric signal or, simply, an analog signal. In some embodiments, the pointing stick 24 is configured to provide the analog signal to the sensor substrate 38 and the sensor substrate is configured to transmit the analog signal to a logic substrate 40.

In various embodiments, the logic substrate 40 is disposed on the lower surface 30b of a portion straddling the boundary between the first plate 31a and the second plate 31b. The logic substrate 40, in some embodiments, is configured to receive the analog signal transmitted from the sensor substrate 38 when the pointing stick 24 is operated and convert the analog signal into a digital electric signal or, simply, a digital signal. In certain embodiments, the logic substrate 40 is electrically connected to the sensor substrate 38 via the cable 42.

The cable 42, in some embodiments, includes a flexible printed circuit (FPC). In various embodiments, the cable 42 extends along the front-rear direction on the side of the lower surface of the light guide plate 34.

Figure 4:
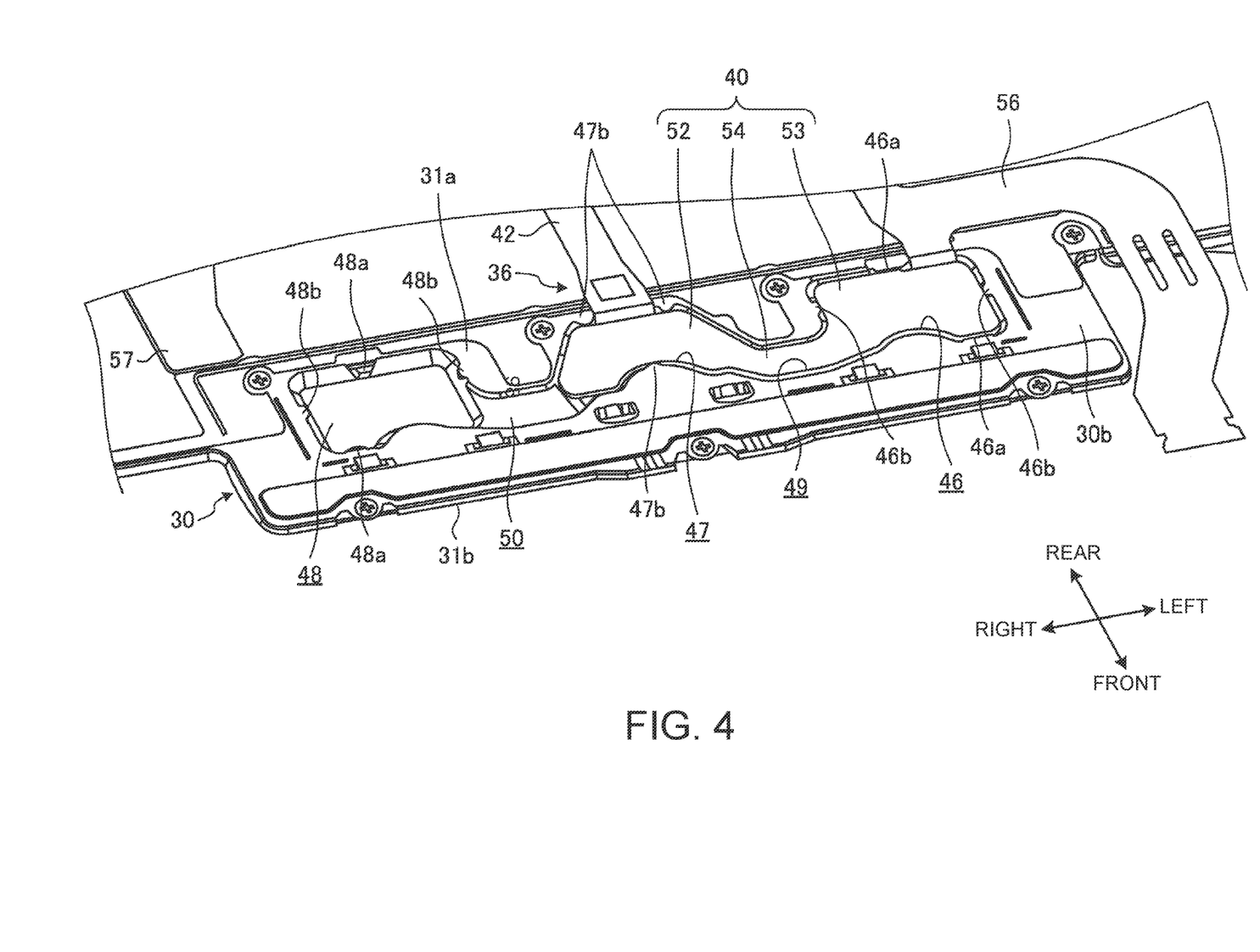
FIG. 4 is a diagram schematically illustrating a perspective view of the bottom surface of the laptop computing device of FIG. 1 and one embodiment of a keyboard baseplate included in the laptop computing device of FIG. 1.
Figure 5:
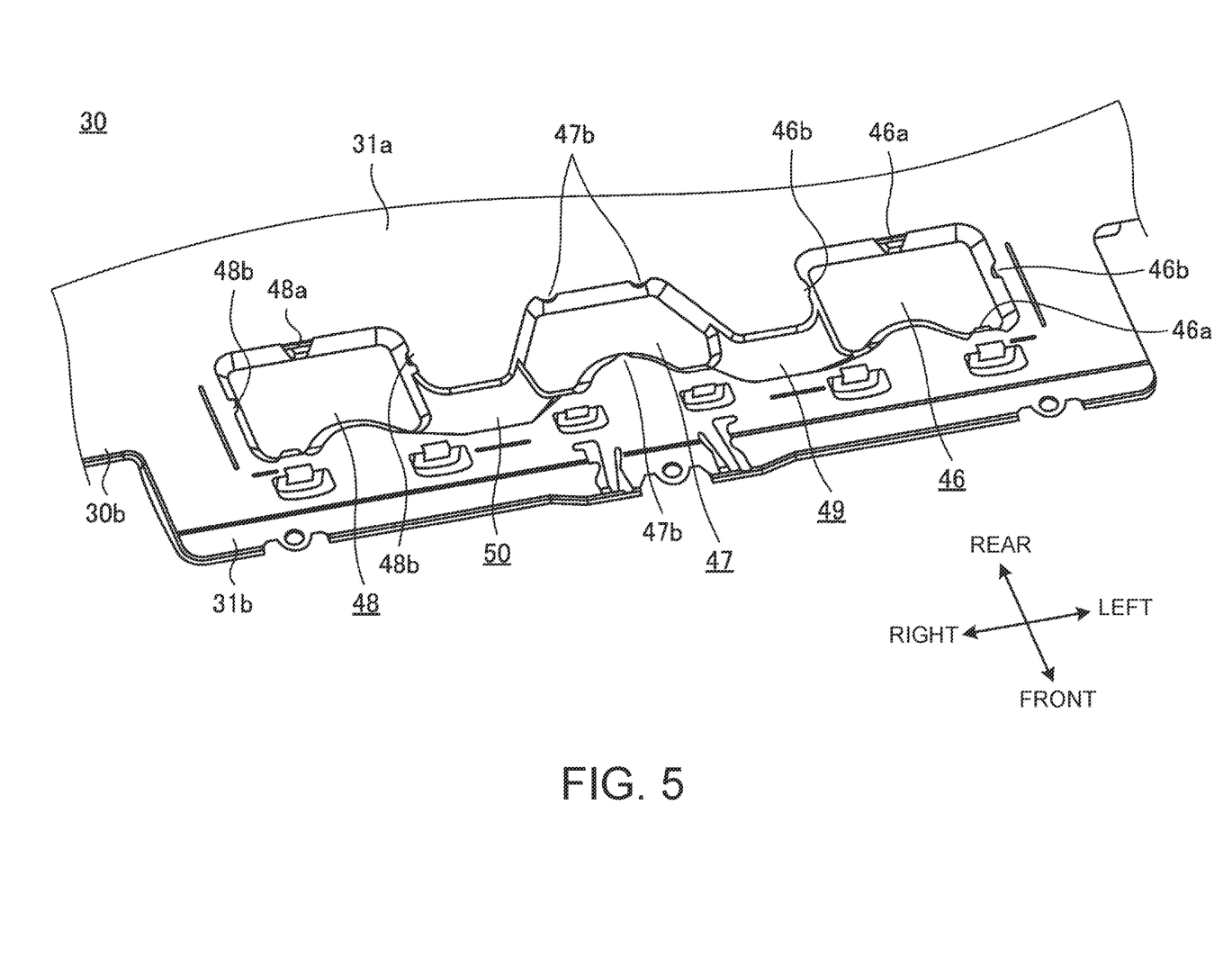
FIG. 5 is a schematic diagram illustrating a perspective view of the keyboard baseplate of FIG. 4.
Figure 6B:
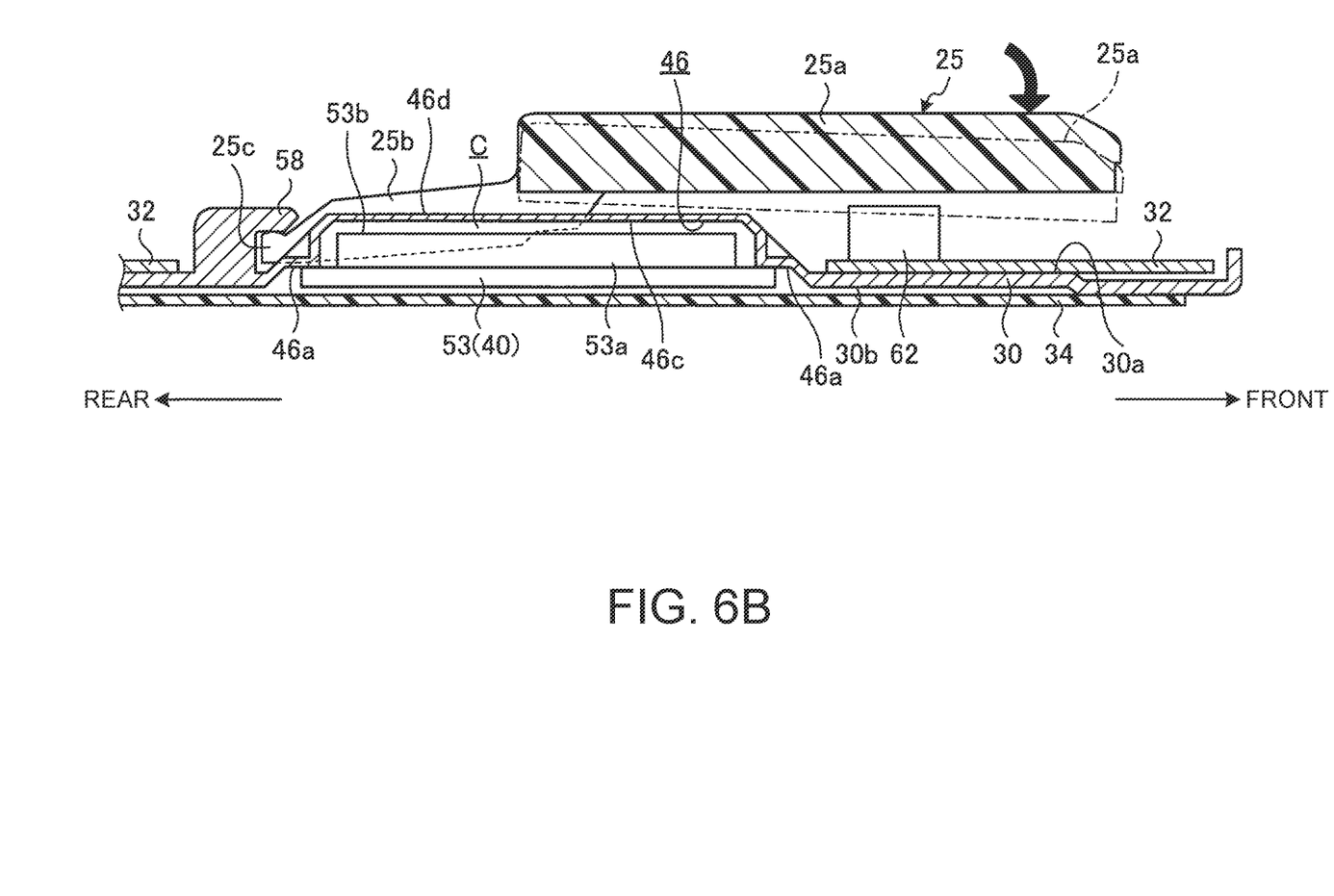
FIG. 6B is a schematic diagram illustrating a cross-sectional view along the line VIB-VIB shown in FIG. 2.
Figure 7:
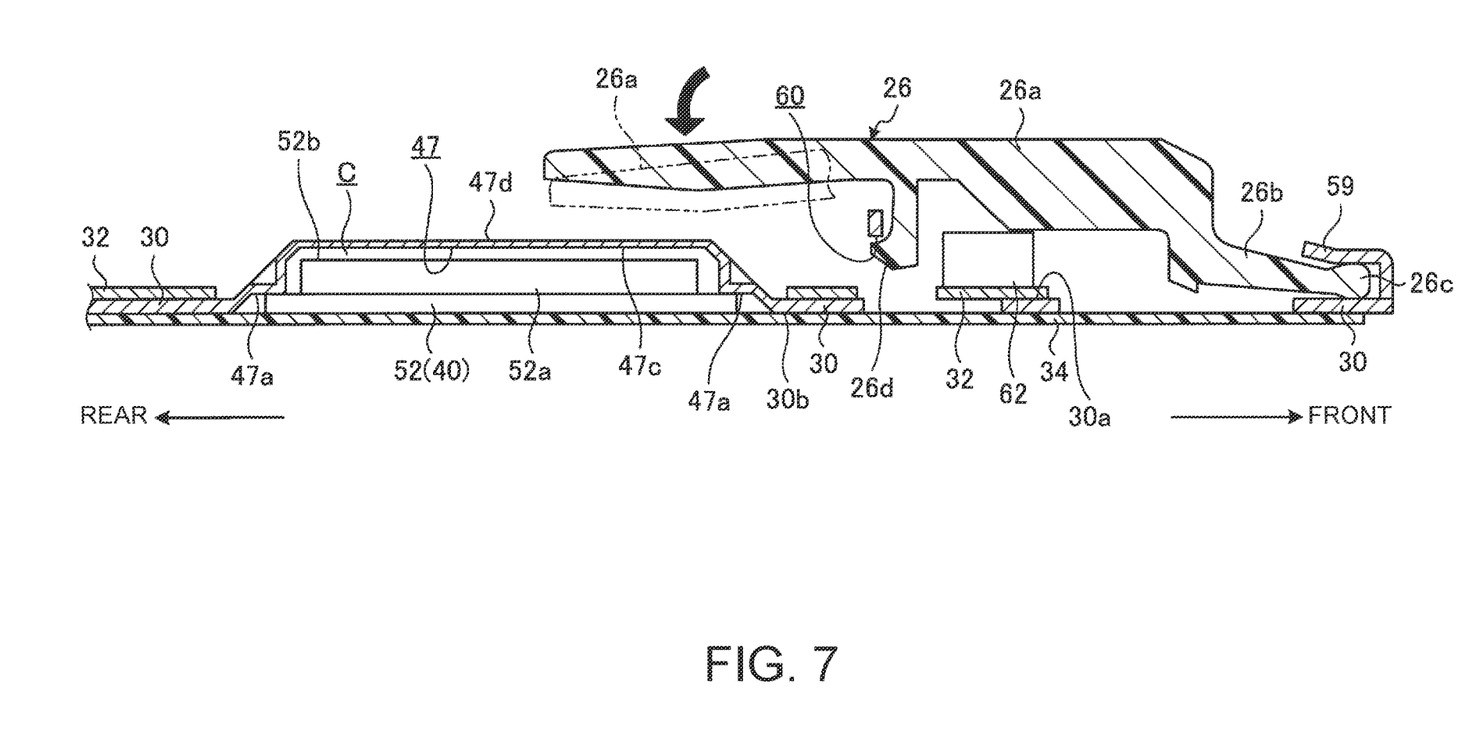
FIG. 7 is a diagram schematically illustrating a cross-sectional view along the line VII-VII shown in FIG. 2.

As discussed below, FIG. 4 is a perspective view of a bottom surface of the second plate 31b and a portion thereabout and FIG. 5 is a perspective view of the baseplate 30 illustrated in FIG. 4, alone. As further discussed below, FIGS. 6A and 6B are schematic cross-sectional views along line VIA-VIA and line VIB-VIB, respectively, in FIG. 2 and FIG. 7 is a schematic cross-sectional view along line VII-VII in FIG. 2.

As illustrated in FIGS. 4 and 5, three (3) concave structures 46, 47, and 48 are formed aligned on the lower surface 30b of the baseplate 30. The concave structures 46, 47, and 48 are formed in a position straddling the boundary between the first plate 31a and the second plate 31b of the baseplate 30. Each of the concave structures 46, 47, and 48 is formed by concaving and/or bending the lower surface 30b of the baseplate 30 toward the side of the upper surface 30a.

As shown in the illustrated embodiment, the left concave structure 46 is provided in a position overlying the left press button 25, the middle concave structure 47 is provided in a position overlying the middle press button 26, and the right concave structure 48 is provided in a position overlying the right press button 27. Each of the concave structures 46 and 48 has a substantially rectangular shape in a plan view and includes a front edge shaped similar to an arc protruding rearward. The concave structure 47 has a substantially trapezoidal shape in a plan view and includes a front edge shaped similar to an arc protruding rearward.

The concave structures 46 and 47 are in communication with each other via a connecting concave structure 49 and the concave structures 47 and 48 are in communication with each other via a connecting concave structure 50. Each of the connecting concave structures 49 and 50 has a band shape that includes a front-rear width that is narrower than that of the concave structure 47 or the like.

The concave structures 46, 47, and 48 and the connecting concave structures 49 and 50, in various embodiments, are formed by a press molding process relative to the baseplate 30. Further, the concave structures 46, 47, and 48 include a depth reaching above the upper surface 30a of the baseplate 30. The connecting concave structures 49 and 50, in some embodiments, are more shallow or shallower (e.g., less deep) than the concave structures 46, 47, and 48 to prevent the convex structures on the side of the upper surface 30a of the baseplate 30 or the reverse/opposite structures of the connecting concave structures 49 and 50 from interfering with the hinge arms 25b and 26b.

In the embodiment illustrated in FIG. 5, the left concave structure 46 includes a set of protruding support mounts 46a on the respective front and rear inside wall surfaces (see also, FIG. 6B). The support mount 46a is formed in the vicinity of the middle in the depth direction of the concave structure 46. In an alternative embodiment, the support mounts 46a may be formed on the respective right and left inside wall surfaces. In some embodiments, the support mount 46a abuts on and supports the logic substrate 40.

The right concave structure 48, in certain embodiments, includes a support mount 48a similar to the support mount 46a. Here, the support mount 48a can be omitted because the logic substrate 40 is not housed in the concave structure 48 in this embodiment.

In some embodiments, the middle concave structure 47 does not include a support mount (see, e.g., FIG. 5) because the concave structure 47 can support the logic substrate 40 with its tapered inside wall surface. In an alternative embodiment illustrated in FIG. 7, the concave structure 47 may include a support mount 47a similar to the support mount 46a.

As further included in the embodiment illustrated in FIG. 5, the concave structures 46, 47, and 48 include two or three retaining prongs 46b, 47b, and 48b on their opening edges, respectively. Each of the retaining prongs 46b, 47b, and 48b includes a substantially round protrusion that is a part of the opening edge of corresponding one of the concave structures 46, 47, and 48, the part being inwardly protruding.

In the embodiments illustrated in FIGS. 2, 3, and 4, the logic substrate 40 includes a first substrate portion 52, a second substrate portion 53, and a connecting substrate portion 54. In some embodiments, the logic substrate 40 includes a substantially glasses-like shape or a shape the resembles a pair of glasses.

In various embodiments, a plan view of the first substrate portion 52 shoes that the first substrate portion 52 includes a substantially trapezoidal printed circuit board housed in the middle concave structure 47. In certain embodiments, a semiconductor chip 52a is mounted on the upper surface of the first substrate portion 52 (see, e.g., FIG. 7).

A plan view of the second substrate portion 53 shows that the second substrate portion 53, in some embodiments, includes a substantially rectangular printed circuit board housed in the left concave structure 46. In certain embodiments, a semiconductor chip 53a is mounted on the upper surface of the second substrate portion 53 (see e.g., FIG. 6B).

The connecting substrate portion 54, in some embodiments, includes a band-shaped printed circuit board that can be housed in the connecting concave structure 49. The connecting substrate portion 54, in various embodiments, electrically connects the first substrate portion 52 and the second substrate portion 53. In some embodiments, the connecting substrate portion 54 functions substantially as a cable with no semiconductor chip mounted thereon.

In various embodiments, the first substrate portion 52 is electrically connected to the sensor substrate 38 via the cable 42. Here, the second substrate portion 53 joins a backlight cable 57 via a cable 56 and is further electrically connected to the motherboard 20 (see, e.g., FIG. 2). That is, the logic substrate 40 is connected between the sensor substrate 38 and the motherboard 20.

The backlight cable 57, in certain embodiments, includes a cable that connects a light source (e.g., an LED device) that emits light toward the light guide plate 34 and to the motherboard 20. In alternative embodiments, the cable 56 alone (e.g., not joining the backlight cable 57) may be connected to the motherboard 20.

As illustrated in FIGS. 3, 4, 6B, and 7, the first substrate portion 52 of the logic substrate 40 is housed in the concave structure 47, the second substrate portion 53 is housed in the concave structure 46, and the connecting substrate portion 54 is housed in the connecting concave structure 49. That is, the logic substrate 40 is housed in the concave structures 46 and 47 with the semiconductor chips 52a and 53a oriented in an upward posture in which the top surfaces 52b and 53b of the semiconductor chips 52a and 53a are directed to the respective bottom surfaces 46c and 47c of the concave structures 46 and 47. Here, the logic substrate 40 is mounted in a position in which the logic substrate 40 does not project from the lower surface 30b of the baseplate 30 and the semiconductor chips 52a and 53a do not project downward from the lower surface 30b.

In various embodiments, the first substrate portion 52 is supported by the support mount 47a on a portion of its upper surface where the semiconductor chip 52a is not mounted (see, e.g., FIG. 7). Here, the first substrate portion 52 is prevented from being removed from the concave structure 47 because its lower surface is retained by the retaining prong 47b (see, e.g., FIG. 4).

In additional embodiments, the second substrate portion 53 is supported by the support mount 46a on a portion of its upper surface where the semiconductor chip 53a is not mounted (see e.g., FIG. 6B). Here, the second substrate portion 53 is prevented from being removed from the concave structure 46 because its lower surface is retained by the retaining prong 46b (see e.g., FIG. 4). With the logic substrate 40 supported by the support mounts 46a and 47a, the semiconductor chips 52a and 53a are disposed with a space C between their respective top surfaces 52b and 53b and their respective bottom surfaces 47c and 46c of the concave structures 47 and 46 (see, e.g., FIGS. 6B and 7). Here, the semiconductor chips 52a and 53a are disposed so that they not in contact with the metal baseplate 30, which creates an electrically insulated state.

As illustrated in FIG. 2, the left press button 25 includes an operational surface 25a and a pair of right and left hinge arms 25b, 25b. The operational surface 25a, in various embodiments, includes a plate that is configures to receive a user input (e.g., a pressing operation input by a user). In some embodiments, the left hinge arm 25b projects rearward from the left end portion of the rear edge of the operational surface 25a and the right hinge arm 25b projects rearward from the right end portion of the rear edge of the operational surface 25a.

In various embodiments, the right and left hinge arms 25b and 25b are symmetrical to each other. In some embodiments, each hinge arm 25b includes a thinning or tapered shape that becomes narrower in width as it extends in a projecting direction. The leading end 25c of each hinge arm 25b, in certain embodiments, is rotatably engaged with a hook-like bearing 58 (e.g., is capable of nodding) (see, e.g., FIGS. 6A and 6B). The bearing 58, in some embodiments, includes a plate piece formed by, for example, cutting the baseplate 30 and raising the baseplate 30 upward such that the cut portion is bent rearward.

The leading end 25c of the hinge arm 25b, in certain embodiments, may be pivoted on the baseplate 30 on a rotational axis or the like. As described elsewhere herein, various embodiments of the hinge arm 26b include a structure similar to the hinge arm 25b.

In the embodiment illustrated in FIG. 2, the right press button 27 includes the same structure as that of the left press button 25 (e.g., the left press button 25 and the right press button 27 are symmetrical to each other). In other words, structural components of the press button 27 are the same as or similar to the structural components of the press button 25 and are given the same reference symbols but are not described in detail herein.

Further included in the embodiment illustrated in FIG. 2, the middle press button 26 includes an operational surface 26a and a pair of right and left hinge arms 26b and 26b. The operational surface 26a, in various embodiments, includes a plate that is smaller than the operational surfaces 25a of the left and right press buttons 25 and 27.

In some embodiments, the left hinge arm 26b projects forward from the left end portion of the front edge of the operational surface 26a and the right hinge arm 26b projects forward from the right end portion of the front edge of the operational surface 26a. The right and left hinge arms 26b, 26b are symmetrical to each other. The leading end 26c of each hinge arm 26b, in various embodiments, is rotatably engaged with a hook-like bearing 59 (e.g., are capable of nodding) (see, e.g., FIG. 7).

The bearing 59 includes a plate piece formed by, for example, cutting the baseplate 30 and raising the baseplate 30 upward such that the cut portion is bent rearward. On the lower surface of the operational surface 26a, for example, at the middle or substantial middle thereof in the front-rear direction, a projecting retained piece 26d is formed. The retained piece 26d, in some embodiments, is slidably engaged with a long hole 60 extending in the up-down direction. In some embodiments, the long hole 60 is formed by, for example, cutting the baseplate 30 and raising the baseplate 30 upward. Specifically, the retained piece 26d is retained on the ceiling surface of the long hole 60 to thereby function as a removal stopper of the press button 26.

With the above structure, the left and right press buttons 25 and 27 can rotate with the engagement portion between the leading end 25c of the hinge arm 25b projecting further rearward than the operational surface 25a, and the bearing 58 being a rotational fulcrum. The middle press button 26, in certain embodiments, is rotatable with the engagement portion between the leading end 26c of the hinge arm 26b projecting further forward than the operational surface 26a, and the bearing 59 being a rotational fulcrum. Each of the press buttons 25, 26, and 27 are configured to switch ON the switch 62 with its respective lower surface when the operational surfaces 25a and 26a are pressed, which thereby causes the press buttons 25, 26, and 27 to rotate.

As illustrated in FIGS. 2, 6A, and 6B, the left concave structure 46 is provided in a position overlying the left press button 25. In other words, a convex structure 46d, or the reverse/opposite of the concave structure 46, is formed on the upper surface 30a of the baseplate 30 and the convex structure 46d is disposed on the side of the lower surface of the press button 25. Here, the convex structure 46d (or the concave structure 46) is positioned between the right and left hinge arms 25b and 25b in the right-left direction. Further, the convex structure 46d is formed in a range extending from the leading end 25c of the hinge arm 25b to the vicinity of the middle of the operational surface 25a in the front-rear direction. As such, the convex structure 46d does not interfere with a pressing motion of the press button 25, which is indicated by the operational surface 25a being illustrated with a two-dot chain line in FIG. 6B.

As illustrated in FIGS. 2 and 7, the middle concave structure 47 is provided in a position overlying the middle press button 26. In other words, a convex structure 47d, or the reverse/opposite of the concave structure 47, is formed on the upper surface 30a of the baseplate 30 and the convex structure 47d is disposed on the side of the lower surface of the press button 26. Here, the convex structure 47d (or the concave structure 47) is positioned overlying the operational surface 26a in the right-left direction. Further, the convex structure 47d is formed in a range extending rearward from the vicinity of the middle of the operational surface 26a in the front-rear direction to further rearward of the operational surface 26a. As such, the convex 47d does not interfere with a pressing motion of the press button 26, which is indicated by the operational surface 26a being illustrated with a two-dot chain line in FIG. 7.

As described elsewhere herein, the keyboard device 10, in various embodiments, includes the baseplate 30, the pointing stick 24, the sensor substrate 38, and the logic substrate 40. The baseplate 30, in various embodiments, includes the concave structures 46 and 47 formed by, for example, concaving/bending the lower surface 30b toward the side of the upper surface 30a, and the logic substrate 40 being housed in the concave structures 46 and 47. As further described elsewhere herein, the keyboard device 10 includes the logic substrate 40 is housed in the concave structures 46 and 47, which are provided on the lower surface 30b of the baseplate 30. Here, the logic substrate 40 can be prevented from projecting from the lower surface 30b, which enables and/or allows a reduction in the thickness of the keyboard device 10 or a keyboard device 10 with a low profile (e.g., a low-profile keyboard device 10). As such, the keyboard device 10, when mounted on the main chassis 16 of the electronic apparatus 12, is able to prevent the logic substrate 40 from occupying a space that can be utilized for the installation of one or more other devices (e.g., a battery device in the main chassis 16), which can further contribute to the main chassis 16 being thinner and/or including a low/lower profile.

In some embodiments that include the semiconductor chips 52a and 53a of the logic substrate 40 disposed in an upward direction, the semiconductor chips 52a and 53a are inserted in the openings formed on the baseplate 30 to thereby reduce the relative thicknesses of the semiconductor chips 52a and 53a compared to a conventional structure. Further, conventional structures can include a separate structure to protect the semiconductor chips 52a and 53a against water and/or electrostatic discharge (ESD), which further results in an increased thickness of a conventional keyboard device.

In contrast, various embodiments of the keyboard device 10 include the logic substrate 40 housed in the concave structures 46 and 47 on the side of the lower surface 30b of the baseplate 30. Including the logic substrate 40 housed in the concave structures 46 and 47 on the side of the lower surface 30b of the baseplate 30 allows and/or enables the semiconductor chips 52a and 53a to be waterproofed. Consequently, should liquid, such as a beverage, enter the keyboard device 10 through the space between the key tops 22, the logic substrate 40 can be prevented from becoming wet and/or being exposed to moisture and thereby failing. Further, because the logic substrate 40 is housed in the metal concaves 46 and 47, the effects of ESD can be eliminated or, at least, reduced. In addition, because the baseplate 30 does not utilize an opening for the installation of the logic substrate 40, the strength of the baseplate 30 remains intact and/or is not weakened when the logic substrate 40 is installed.

To further waterproof and/or ESD-proof the keyboard device 10, various embodiments of the concave structures 46, 47, and 48 include a structure similar to a bathtub. In some embodiments, the bathtub structure is fully enclosed. In other embodiments, the bathtub structure includes fine and/or small holes/apertures.

The keyboard device 10, in some embodiments, includes the logic substrate 40 disposed in a position overlying the press buttons 25 and 26, which are rotatably cantilevered on the side of the upper surface 30a of the baseplate 30. Compared to key tops 22 that include operational surfaces that move up and down as a whole, press buttons 25 and 26 that are rotational use less space, which ensures that there is sufficient operational space on the side of the lower surface of the press buttons 25 and 26. As such, the concave structures 46, 47, and 48 are provided below the press buttons 25, 26, and 27 of the keyboard device 10 so that the concave structures 46, 47, and 48 can have an enough depth to fully house the logic substrate 40 therein.

Alternatively, the logic substrate 40 may be disposed so as to partially and/or slightly project from the opening of the concave structures 46 and 47. In the case where the logic substrate 40 includes a very thin and/or an extremely low profile, for example, the concave structures 46, 47, and 48 may be provided in a position overlying the frame 23 besides a position overlying the press buttons 25, 26, and 27.

In various embodiments, the press button 25 moves its operational surface 25a up and down via a nodding operation of the hinge arm 25b projecting outward from one edge of the operational surface 25a. Here, because the press button 25 does not include a hinge or the like disposed below its operational surface 25a, a space large enough and/or sufficient for forming the concave structure 46 (or the convex structure 46d) can be ensured. Similarly, because the middle press button 26 does not include a hinge or the like disposed below its operational surface 26a, a space large enough and/or sufficient for forming the concave structure 47 (or the convex structure 47d) can be ensured.

In certain embodiments, as the leading end 25c of the hinge arm 25b is pivoted on the bearing 58 formed by cutting and raising the baseplate 30, the hinge arm 25b is disposed lower than the operational surface 25a. In view of the above and as illustrated in FIG. 6A and FIG. 6B, the concave structure 46 (and the convex structure 46d) of the keyboard device 10 is disposed in a position between the right and left hinge arms 25b and 25b of the press button 25. In other words, the concave structure 46 (and the convex structure 46d) is positioned so that the hinge arm 25b is not overlying the concave structure 46. Here, the concave structure 46 (and the convex structure 46d) can be formed with an enough depth to reliably house the logic substrate 40 therein so that the concave structure 46 does not interfere with the operation of the hinge arm 25b when the press button 25 is operated. Similarly, because the hinge arm 26b is positioned so that it is not overlying the concave structure 47 (and the convex structure 47d), the concave structure 47 does not interfere with the operation of the hinge arm 26b when the press button 26 is operated.

The embodiment described above includes a structure in which the logic substrate 40 is housed within two concave structures 45 and 47 out of three concave structures 46, 47, and 48. In alternative embodiments, the logic substrate 40 may be mounted using all three concave structures 46, 47, and 48. In further alternative embodiments, the logic substrate 40 may be mounted using one of the concave structures 46, 47, and 48. In still further alternative embodiments, four or more concave structures may be formed and the quantity of portions of the logic substrate 40 may be changed depending on the quantity of concave structures formed thereon.

While the present technology has been described in each form, the technical scope of the present technology is not limited to the scope of the above-described aspects, and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
   a keyboard baseplate including a concave structure formed thereon, an upper surface including a first side and a second side, and a lower surface including a third side;

a first press button rotatably supported on the first side of the upper surface of the keyboard baseplate;
a second press button rotatably supported on the second side of the upper surface of the keyboard baseplate; and
a logic substrate provided on the third side of the lower surface of the keyboard baseplate,
wherein:
the logic substrate is housed within the concave structure,
the logic substrate is configured to receive an analog signal generated by a sensor and convert the analog signal to a digital signal,
the concave structure includes at least a first concave portion provided in a first position overlying the first press button and a second concave portion provided in a second position overlying the second press button,
the logic substrate includes at least a first substrate portion and a second substrate portion electrically coupled to the first substrate portion,
the first substrate portion is housed in the first concave portion, and
the second substrate portion is housed in the second concave portion.

2. The apparatus of claim 1, further comprising:
a semiconductor chip mounted on a surface of the logic substrate,
wherein:
the semiconductor chip is housed within the concave structure in a position in which a top surface of the semiconductor chip is directed to a bottom surface of the concave structure, and
the concave structure includes a support mount configured to support the logic substrate to thereby create a space between the top surface of the semiconductor chip and the bottom surface.

3. The apparatus of claim 1, wherein the first press button comprises:
an operational surface configured to receive a pressing operation; and
a hinge arm projecting from an edge of the operational surface, the hinge arm including a leading end portion that is rotatably supported relative to the baseplate.

4. The apparatus of claim 3, wherein:
the concave structure is disposed in a position overlying the operational surface and not overlying the hinge arm.

5. The apparatus of claim 1, further comprising:
a pointing stick provided on a side of an upper surface of the keyboard baseplate; and
a sensor substrate coupled to the pointing stick and the logic substrate,
wherein the sensor substrate is configured to:
detect an operating force applied to the pointing stick,
generate the analog signal in response to detecting the operating force applied to the pointing stick, and
transmit the analog signal to the logic substrate.

6. The apparatus of claim 1, wherein:
the concave structure comprises a bathtub structure; and
one of:
the bathtub structure is fully enclosed, and
the bathtub structure includes a set of small holes.

7. An apparatus, comprising:
a keyboard baseplate including a concave structure formed thereon and a lower surface including a side;
a logic substrate provided on the side of the lower surface of the keyboard baseplate; and
a press button rotatably supported on a first side of an upper surface of the keyboard baseplate,
wherein:
the logic substrate is housed within the concave structure,
the logic substrate is configured to receive an analog signal generated by a sensor and convert the analog signal to a digital signal,
the concave structure is provided in a position overlying the press button, and
the press button comprises:
an operational surface configured to receive a pressing operation, and
a hinge arm projecting from an edge of the operational surface, the hinge arm including a leading end portion that is rotatably supported relative to the keyboard baseplate.

8. The apparatus of claim 7, wherein:
the press button is a first press button;
the apparatus further comprises a second press button rotatably supported on a second side of the upper surface of the baseplate;
the concave structure includes at least a first concave portion provided in a first position overlying the first press button and a second concave portion provided in a second position overlying the second press button;
the logic substrate includes at least a first substrate portion and a second substrate portion electrically coupled to the first substrate portion;
the first substrate portion is housed in the first concave portion; and
the second substrate portion is housed in the second concave portion.

9. The apparatus of claim 7, wherein:
the concave structure is disposed in a position overlying the operational surface and not overlying the hinge arm.

10. The apparatus of claim 9, wherein:
the press button is a first press button;
the apparatus further comprises a second press button rotatably supported on a second side of the upper surface of the baseplate;
the concave structure includes at least a first concave portion provided in a first position overlying the first press button and a second concave portion provided in a second position overlying the second press button;
the logic substrate includes at least a first substrate portion and a second substrate portion electrically coupled to the first substrate portion;
the first substrate portion is housed in the first concave portion; and
the second substrate portion is housed in the second concave portion.

11. The apparatus of claim 7, further comprising:
a pointing stick provided on a side of an upper surface of the keyboard baseplate; and
a sensor substrate coupled to the pointing stick and the logic substrate,
wherein the sensor substrate is configured to:
detect an operating force applied to the pointing stick,
generate the analog signal in response to detecting the operating force applied to the pointing stick, and
transmit the analog signal to the logic substrate.

12. The apparatus of claim 7, wherein:
the concave structure comprises a bathtub structure; and
one of:
the bathtub structure is fully enclosed, and
the bathtub structure includes a set of small holes.

13. The apparatus of claim 7, further comprising:
a semiconductor chip mounted on a surface of the logic substrate,
wherein:
the semiconductor chip is housed within the concave structure in a position in which a top surface of the semiconductor chip is directed to a bottom surface of the concave structure, and
the concave structure includes a support mount configured to support the logic substrate to thereby create a space between the top surface of the semiconductor chip and the bottom surface.

14. A system, comprising:
a display device; and
a keyboard device coupled to the display device, the keyboard device comprising:
a keyboard baseplate including a concave structure formed thereon, an upper surface including a first side, and a lower surface including a second side,
a press button rotatably supported on a first side of the upper surface of the baseplate, the press button comprising:
an operational surface configured to receive a pressing operation, and
a hinge arm projecting from an edge of the operational surface, the hinge arm including a leading end portion that is rotatably supported relative to the baseplate, and
a logic substrate provided on the second side of the lower surface of the keyboard baseplate,
wherein:
the logic substrate is housed within the concave structure,
the logic substrate is configured to receive an analog signal generated by a sensor and convert the analog signal to a digital signal, and
the concave structure is provided in a position overlying the press button.

15. The system of claim 14, wherein:
the press button is a first press button;
the apparatus further comprises a second press button rotatably supported on a second side of the upper surface of the baseplate;
the concave structure includes at least a first concave portion provided in a first position overlying the first press button and a second concave portion provided in a second position overlying the second press button;
the logic substrate includes at least a first substrate portion and a second substrate portion electrically coupled to the first substrate portion;
the first substrate portion is housed in the first concave portion; and
the second substrate portion is housed in the second concave portion.

16. The system of claim 14, wherein:
the concave structure is disposed in a position overlying the operational surface and not overlying the hinge arm.

17. The system of claim 16, wherein:
the press button is a first press button;
the apparatus further comprises a second press button rotatably supported on a second side of the upper surface of the baseplate;
the concave structure includes at least a first concave portion provided in a first position overlying the first press button and a second concave portion provided in a second position overlying the second press button;
the logic substrate includes at least a first substrate portion and a second substrate portion electrically coupled to the first substrate portion;
the first substrate portion is housed in the first concave portion; and
the second substrate portion is housed in the second concave portion.

18. The system of claim 14, further comprising:
a pointing stick provided on a side of an upper surface of the keyboard baseplate; and
a sensor substrate coupled to the pointing stick and the logic substrate,
wherein the sensor substrate is configured to:
detect an operating force applied to the pointing stick,
generate the analog signal in response to detecting the operating force applied to the pointing stick, and
transmit the analog signal to the logic substrate.

19. The system of claim 14, wherein:
the concave structure comprises a bathtub structure; and one of:
the bathtub structure is fully enclosed, and
the bathtub structure includes a set of small holes.

20. The system of claim 14, further comprising:
a semiconductor chip mounted on a surface of the logic substrate,
wherein:
the semiconductor chip is housed within the concave structure in a position in which a top surface of the semiconductor chip is directed to a bottom surface of the concave structure, and
the concave structure includes a support mount configured to support the logic substrate to thereby create a space between the top surface of the semiconductor chip and the bottom surface.

* * * * *